United States Patent [19]
Morrison

[11] Patent Number: 6,005,583
[45] Date of Patent: Dec. 21, 1999

[54] PRECISE GRADIENT CALCULATION SYSTEM AND METHOD FOR A TEXTURE MAPPING SYSTEM OF A COMPUTER GRAPHICS SYSTEM

[75] Inventor: Teresa M. Morrison, Fort Collins, Colo.

[73] Assignee: Hewlett-Packard Company, Palo Alto, Calif.

[21] Appl. No.: 08/846,744

[22] Filed: Apr. 30, 1997

[51] Int. Cl.$^6$ .................................................. G09B 9/08
[52] U.S. Cl. ...................... 345/430; 345/425; 345/427
[58] Field of Search ................................... 345/430, 425, 345/426, 427, 429, 428

[56] References Cited

U.S. PATENT DOCUMENTS

| | | | |
|---|---|---|---|
| 5,224,208 | 6/1993 | Miller, Jr. et al. | 345/425 |
| 5,490,240 | 2/1996 | Foran et al. | 345/430 |
| 5,719,599 | 2/1998 | Yang | 345/430 |
| 5,719,600 | 2/1998 | Alcorn | 345/430 |
| 5,745,667 | 4/1998 | Kawase et al. | 345/430 |

*Primary Examiner*—John E. Breene
*Assistant Examiner*—Tadesse Hailu

[57] ABSTRACT

A gradient calculation system efficiently calculates precise gradients for planar surfaces of primitives in computer graphics systems using exact closed form solutions. The system is particularly suited for calculating gradients to enable selection of an appropriate texture map resolution in a texture mapping system. In architecture, the gradient calculation system can be implemented in software, hardware, or a combination thereof, and is more particularly implemented as follows. A texture mapping system is provided with a plurality of MIP maps with different texel resolutions. A gradient calculation system associated with the texture mapping system computes texel gradients relative to a pixel of a primitive using closed form equations that result in exact gradients. MIP map selection logic associated with the texture mapping system selects an appropriate MIP map for the pixel from the plurality of MIP maps based upon the calculated exact gradients. Optionally, the system may further include a performance optimization feature for assigning the appropriate MIP map to subsequent pixels of, preferably, the entire primitive, or secondarily, to subsequent pixels of a span of the primitive, when certain gradient criteria are met.

30 Claims, 6 Drawing Sheets

PRECISE GRADIENT CALCULATION SYSTEM AND METHOD FOR A TEXTURE MAPPING SYSTEM OF A COMPUTER GRAPHICS SYSTEM

FIELD OF THE INVENTION

The present invention relates generally to computer graphics systems, and, more particularly, to a system and method for efficiently calculating precise gradients for planar surfaces in computer graphics systems Although not limited to this application, the invention is particularly suited for calculating very accurate gradients to enable selection of an appropriate texture map resolution in a texture mapping system.

BACKGROUND OF THE INVENTION

Computer graphics systems commonly are used for displaying graphical representations of objects on a two dimensional computer display screen. Current computer graphics systems can provide highly detailed representations and are used in a variety of applications.

In typical computer graphics systems, an object to be represented on the computer display screen is broken down into a plurality of graphics primitives, a triangular example of which is shown in FIG. 1 and designated by reference numeral 11. Primitives 11 are basic components of a graphics picture and may include points, vectors (lines), and polygons, such as the triangular primitive 11 of FIG. 1. Each triangular primitive 11 is made up of spans 12 of picture elements 13 (pixels). Hardware and/or software is implemented to render, or draw, on the two-dimensional display screen, the graphics primitives 11 that represent the view of one or more objects being represented on the screen.

The primitives 11 that define the three-dimensional object to be rendered are typically provided by a central processing unit (CPU), which defines each primitive 11 in terms of primitive data. For example, when the primitive 11 is a triangular primitive 11, then the CPU may define the primitive 11 in terms of the x', y', z' pixel coordinates (unnormalized orthogonal coordinate system) of its vertices, as well as the color values (R, G, B values) of each vertex. Rendering hardware interpolates the data from the CPU in order to produce the x, y, z screen coordinates (normalized orthogonal coordinate system) corresponding with the pixels 13 that are activated/deactivated to represent each primitive 11 and the color values (R, G , B values) for each of the screen coordinates x, y, z.

Early graphics systems failed to display images in a sufficiently realistic manner to represent complex three-dimensional objects. The images displayed by such systems exhibited extremely smooth surfaces, absent textures, bumps, scratches, shadows, and other unrealistic surface details. As a result, methods were developed to display images with improved surface detail. Texture mapping is one such method that involves mapping a source image, referred to as a texture, onto a surface of a three-dimensional object, and thereafter mapping the textured three-dimensional object to the two-dimensional graphics display screen to display the resulting image. Surface detail attributes that are commonly texture mapped include, for example, color, specular reflection, transparency, shadows, surface irregularities, etc.

Texture mapping involves applying one or more texture map elements, or texels, of a texture to each pixel 13 of the displayed portion of the object to which the texture is being mapped. Each texel in a texture map is defined by coordinates (generally two or more spatial coordinates, e.g., s, t, and, sometimes, a homogeneous texture effect parameter q) which identify its location in the texture map (two-dimensional or greater). For each pixel 13, the corresponding texel(s) that maps to the pixel 13 is accessed from the texture map via the texel coordinates (e.g., s, t, q of an orthogonal coordinate system) associated with that pixel 13 and is incorporated into the final R, G, B values generated for the pixel 13 to represent the textured object on the display screen. It should be understood that each pixel 13 in an object primitive may not map in a one-to-one correspondence with a single texel in the texture map for every view of the object.

Texture mapping systems typically store data in memory representing a texture associated with the object being rendered. As indicated above, a pixel 13 may map to multiple texels 15. If it is necessary for the texture mapping system to read a large number of texels 15 that map to a pixel 13 from memory to generate an average value, then a large number of memory reads and the averaging of many texel values would be required, which would undesirably consume time and degrade system performance.

To overcome this problem, a well known scheme has been developed that involves the creation of a series of MIP (multum in parvo, or many things in a small place) maps for each texture, and storing the MIP maps of the texture associated with the object being rendered in memory. A set of MIP maps for a texture includes a base map that corresponds directly to the texture map as well as a series of related filtered maps, wherein each successive map is reduced in size by a factor in each of the texture map dimensions (s, t, which may differ). In a sense, the MIP maps represent different resolutions of the texture map.

An illustrative example of a set of MIP maps is shown in FIG. 2 In this simplified example, the MIP maps of FIG. 2 are two dimensional (s, t) and include a base map 14a (the reference) that is eight-by-eight texels 15 in size, as well as a series of maps 14b, 14c, and 14d that are respectively four-by-four texels 15, two-by-two texels 15, and one texel 15 in size. The four-by-four map 14b is generated by box filtering (downsampling) the base map 14a. With box filtering, each texel 15 in the map 14b corresponds to an equally weighted average of four adjacent texels 15 in the base map 14a. Further, the two-by-two map 14c is similarly generated by box filtering map 14b. Finally, the single texel 15 in map 14d is generated by box averaging the four texels 15 in map 14c.

The computer graphics system determines which MIP map 14 in a series of MIP maps 14a14d to access in order to provide the appropriate texture data for a particular pixel 13 based upon the number of texels 15 to which the pixel 13 maps. For example, if the pixel 13 maps in a one-to-one correspondence with a single texel 15 in the texture map, then the base map 14a is accessed. However, if the pixel maps to four, sixteen, or sixty-four texels, then the maps 14b, 14c and 14d are respectively accessed because those maps respectively store texel data representing an average of four, sixteen, and sixty-four texels 15 in the texture map.

In order to determine the number of texels 15 to which a pixel 13 maps so that the appropriate MIP map 14 can be accessed, gradients (mathematical derivatives) of the various texel coordinates with respect to screen coordinates are computed. In this regard, gradient values $\partial i/\partial x$, $\partial i/\partial j$, where i is s, t, and/or q in the texel domain and where x, y are screen coordinates, are calculated. These gradients reflect the rate of change of texture coordinates 15 relative to pixel coordinates 13. Often, a single gradient is allocated to each pixel 13 by selecting the largest gradient.

Prior methods for determining the gradients rely on using some form of either a linear difference formula or a central difference formula The former is more popular than the latter due, in part, to its simplicity and ease of implementation.

With the linear difference formula, each gradient derivative is essentially equal to an old gradient derivative plus a constant. Given the gradient at the vertices of a triangular primitive 11, the gradients along the edges as well as along the spans 12 of the primitive 11 are linearly approximated.

When the central difference formula is employed, each gradient derivative is essentially equal to a weighted sum of nearby gradient derivatives. For more details regarding the use of the central difference formula, see A. Watt and M. Watt, *Advanced Animation and Rendering Techniques*, Addison-Wesley, pp. 300–301 (edition 1995).

Although meritorious to an extent, these methods for calculating gradients are inaccurate, especially for highly spatially perspected rendered primitives 11. The larger the primitive 11, the more spatially perspected and the greater the error. Furthermore, these methods are computationally complex for the degree of accuracy that is accomplished.

Thus, an unaddressed need exists in the industry for a more efficient system and method for determining precise gradients in a texture mapping system of a computer graphics system.

SUMMARY OF THE INVENTION

The invention provides a gradient calculation system and method for efficiently calculating precise gradients for planar surfaces of primitives in computer graphics systems using exact closed form solutions. Although not limited to these particular applications, the system and method are particularly suited for calculating gradients to enable selection of an appropriate resolution (i.e., a MIP map) in a texture mapping system.

In architecture, when employed in connection with a texture mapping system, the gradient calculation system is implemented as follows. The texture mapping system is provided with a plurality of MIP maps with different texel resolutions. A gradient calculation system is associated with the texture mapping system and is configured to compute texel gradients (rate of change) relative to a pixel of a primitive using mathematical closed form equations that result in computation of exact gradients. MIP map selection logic is associated with the texture mapping system and is designed to select an appropriate MIP map for the pixel from the plurality of available MIP maps based upon the calculated exact gradients.

Optionally, the system may further include a performance optimization feature for assigning the appropriate MIP map to subsequent pixels of the entire primitive, or alternatively, to subsequent pixels of a span of the primitive, when certain gradient criteria are met. The decision regarding which of the foregoing optimization schemes to utilize is based upon a balancing between accuracy and performance (speed).

The invention can also be generally conceptualized as providing a method for accurately establishing texture resolution in a texture mapping system associated with a computer graphics system. In this regard, the method can be broadly summarized by the following steps: providing a plurality of MIP maps with different texel resolutions; computing a mathematical closed form solution for texel gradients of one of the MIP maps relative to a pixel; and selecting an appropriate MIP map for the pixel from the plurality of MIP maps based upon the gradients.

The invention has numerous advantages, a few which are delineated, hereafter, as merely examples.

An advantage of the invention is that is provides a system and method for calculating precise gradients for planar surfaces. In fact, the invention provides for the generation of an exact mathematical expression for the gradient at any coordinate location.

Another advantage of the invention is that it provides a system and method for determining precise gradients for texture mapping. In this regard, very accurate mathematical gradients of pixels relative to texels can be computed.

Another advantage of the invention is that it provides a system and method for determining gradients with less logic complexity and higher performance as compared to the prior art methods.

Another advantage of the invention is that it can be employed in association with an optimization feature that, in many instances, allows it to be performed once per primitive rather than once per pixel. In those cases, it has a performance boost over prior art methods.

Another advantage of the invention is, as compared to linear interpolation of the prior art, that it has much higher accuracy for just a couple more mathematical operations (i.e. 2 floating point multiplies).

Another advantage of the invention is, as compared the central difference formula method of the prior art, that it can be performed on a per primitive basis if derivative conditions are met, instead of a per pixel basis, thereby providing higher performance.

Another advantage of the invention is that it can be implemented in hardware, software, or a combinations thereof. When implemented in software, it can be stored, utilized, and transported while residing on any computer readable medium.

Another advantage of the invention is that it can be applied to derive gradients (derivatives) for any number of coordinate dimensions, e.g., two dimensions, three dimensions, etc.

Another advantage of the invention is that it is simple in design and easily implemented on a mass scale for commercial production.

Other features and advantages of the invention will become apparent to one with skill in the art upon examination of the following drawings and detailed description. These additional features and advantages are intended to be included herein within the scope of the present invention.

BRIEF DESCRIPTION OF THE DRAWINGS

The invention can be understood with preference to the following drawing. The drawing are not necessarily to scale, emphasis instead being placed upon dearly illustrating principles of the invention. Furthermore, in the drawings, like reference numerals designate corresponding parts throughout the several views.

DETAILED DESCRIPTION OF THE PREFERRED EMBODIMENT

The gradient calculation system of the invention can be implemented in association with, for example, a texture mapping system (FIGS. 3 through 6). Moreover, the gradient calculation system can be implemented in hardware (FIGS. 5 and 6), software (FIGS. 3), or a combination thereof. When implemented in software, the gradient calculation system can be stored, transported, and/or utilized while residing on any computer-readable medium for use by or in connection with any suitable computer-based system. In the context of this document, a computer-readable medium is an electronic, magnetic, optical, or other physical device or means that can contain or store a computer program for use by or in connection with a computer-based system.

A. First Embodiment

A first embodiment of the invention will now be described with reference to FIG. 3. In general, FIG. 3 is an electronic block diagram of a computer system 16 having the gradient calculation system 10 of the invention implemented in software in a main system memory 18 in connection with a texture mapping system 19 that is also implemented in software (S/W).

Figure 3:
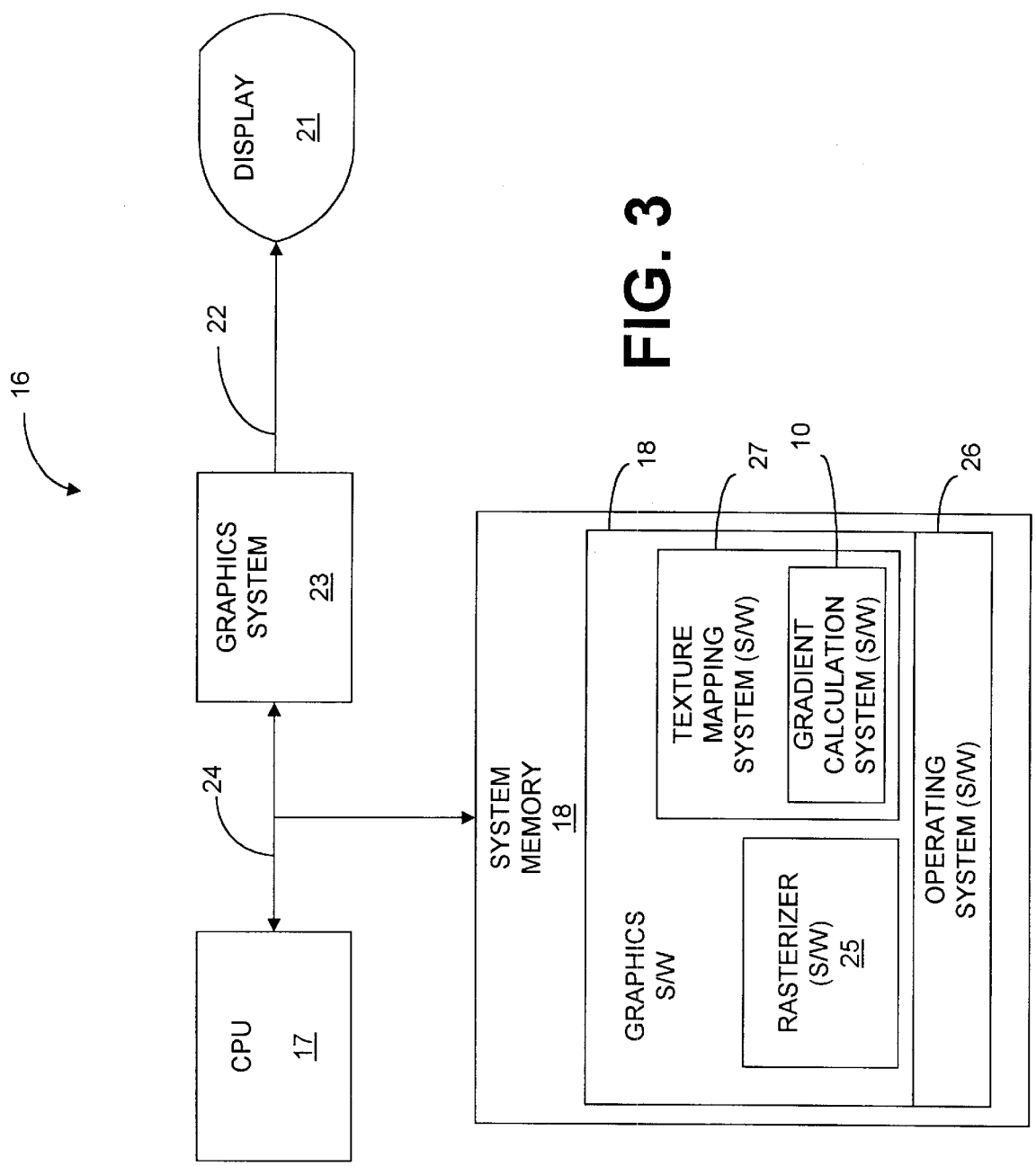
FIG. 3 is an electronic block diagram of a computer system having a gradient calculation system in accordance with a first embodiment of the invention implemented in a main system memory in connection with a texture mapping system in software (S/W)

As shown in FIG. 3, the computer 16 includes a central processing unit (CPU) 17, a main system memory 18 for storing software that is executed by the CPU 17, a graphics system 23 for processing graphics data received from the CPU 17, a local interface 24 configured to electrically interconnect the foregoing elements, and a display 21 (e.g., a computer monitor) connected to the graphics system 23 via a connection 22 and configured to display the image data generated by the graphics system 23.

Figure 2:
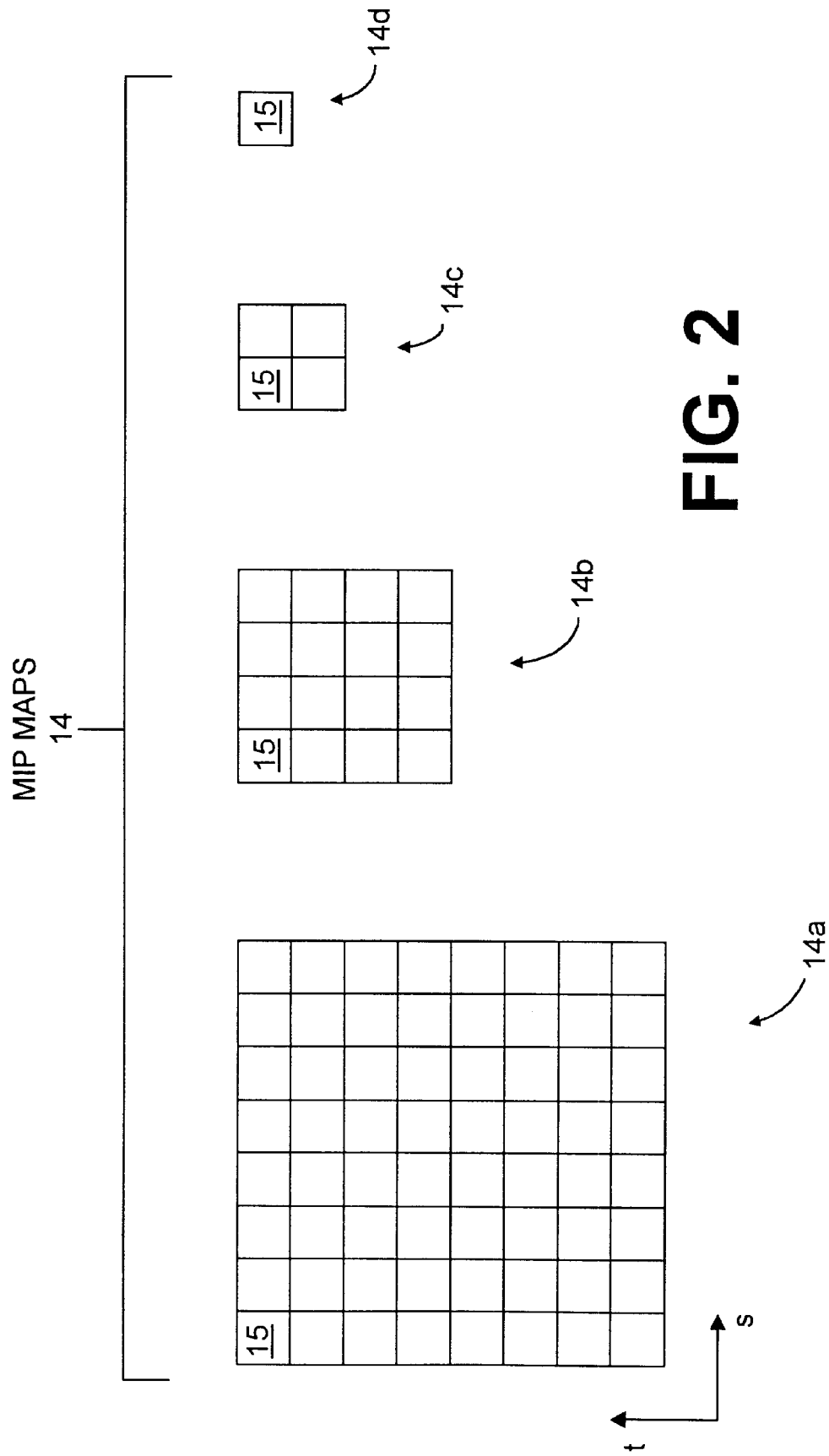
FIG. 2 is a schematic diagram of an example implementation of MIP maps for a computer graphics system.

The main system memory 18 includes graphics software 19 as well as any suitable operating system 26. The graphics software 19 includes a rasterizer 25 that operates in association with a texture mapping system 27 in order to convert primitive data into pixel data for the display 21. The gradient calculation system 10 of the invention is configured to compute precise gradients for the texture mapping system 27 so that appropriate MIP maps 14 (FIG. 2) are selected for pixels 13 in the image data.

Figure 1:
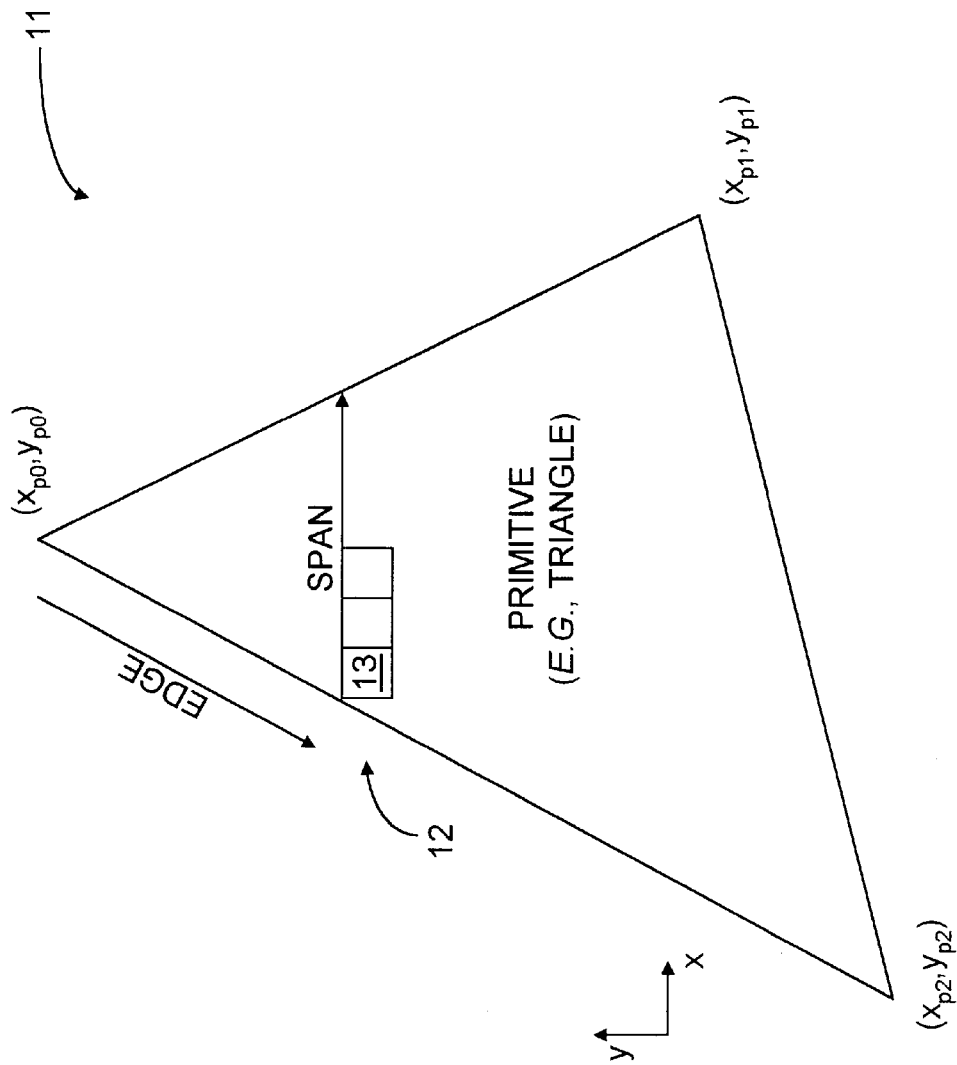
FIG. 1 is a schematic diagram of an example (triangle) of a primitive that is generated and processed in a computer graphics system.

When performing rendering, spatial perspective correction may be employed. This feature uses the spatial homogeneous coordinate w to correct the user selected x and y coordinates. A completely orthogonal concept to this is to add a texture homogeneous coordinate q to the primitive which provides a special effect such as adding a shape to a light shining on a cone. The special effect coordinate q is provided from a user either via a texture orientation matrix or as a per vertex coordinate. As shown in FIG. 3, the software-based rasterizer 25 is responsible for sending s/w, t/w, q/w to the texture mapping system 27 for the first pixel in each of the spans 12 (FIG. 1) that the texture mapping system 27 processes. The rasterizer 25 linearly interpolates these values along the edge of the primitive 11 (FIG. 1).

The texture mapping system 27 will interpolate the values along the span 12 and will use s/q, t/q as texture map indices. However, when determining the gradient at a pixel 13 (FIG. 1), rather than using linear approximation, the gradient calculation system 10 of the invention uses an exact closed form equation for the gradient.

Because the industry standard, i.e., OpenGL Specification 1.1, section 3.8.1, does not specify the equations for the texture homogeneous effect q, it is useful to list them here. The rasterizer 25 is configured to perform the calculation of s/w, t/w, q/w for the first pixel 13 to be processed in each span 12. The rasterizer 25 will also perform the calculation $$\frac{\partial s_p}{\partial x_p}, \frac{\partial s_p}{\partial y_p}, \frac{\partial t_p}{\partial x_p}, \frac{\partial t_p}{\partial y_p}, \frac{\partial q_p}{\partial x_p}, \frac{\partial q_p}{\partial y_p},$$

once per primitive 11.

The texture mapping system 27 is configured to perform the calculation of s/w, t/w, q/w for each pixel 13 within a span 12, after the first pixel 13. It is also configured to calculate the texel gradient once for each pixel 13 and divide s/w by q/w, and t/w by q/w to get the associated texture map indices once for each pixel 13.

For texture mapping, the texture map indices for each pixel 13 in the primitive 11 and the gradient at each pixel 13 both need to be computed by the texture mapping system 27. To see what the equations will be, a mathematical derivation for a general case which covers all cases is set forth hereafter. Note that at least the following cases are covered by the derivation: (1) a non-spatially perspective corrected primitive 11 with or without the texture homogeneous effect, and (2) a spatially perspected primitive with or without the texture homogeneous effect. When a primitive 11 is not spatially perspected, then substitute w=1 in the following equations. Also, when the homogeneous effect q is turned off, the rasterizer 25 receives a value of 1 for q, so substitute q=1 in the following equations.

1. Derivation of Gradient Equations

First consider the scenario where the three pixels 13 that make up vertices of a triangular primitive 11 are non-equal. Two identical pixels 13 under the line derivation and three identical pixels under the point derivation will be covered later in this document. In the immediately following discussion, a closed form solution is derived for the texture coordinate indices [s/q, t/q], and the gradient of the texture coordinate indices that is valid for any point in the triangular primitive 11.

a. Derivation of Texture Coordinates in terms of Primitive Vertices

For the interpolation for the texture coordinates, this design uses the fact that for a triangular primitive 11 the variables $s_p, t_p, q_p$ are linear with respect to $x_p$ and also linear with respect to $y_p$.

$$\left[ s_p = \frac{s}{w}, tp_p = \frac{t}{w}, q_p = \frac{q}{w} \right].$$

The Equations 1.1, 1.3, 1.5 below prove that this is correct. We derive an equation for $s_p$ using plane equations. To get the texture indices $[s_p/q_p, t_p/q_p]$, $s_p$ is divided by $q_p$, and $t_p$ is divided by $q_p$.

The screen coordinates of a triangular primitive 11, specified by three distinct pixel points $(x_{po}, y_{po})$, $(x_{p1}, y_{p1})$ and $(x_{p2}, y_{p2})$, are given by the plane equation:

$$(\vec{S} - \vec{S}_0) \cdot \vec{a} = 0 \quad \text{[Equation 1.0]}$$

where $$\vec{a} = \vec{v}_{02} \times \vec{v}_{01} = a_{px}\vec{x}_p + a_{py}\vec{y}_p + a_{ps}\vec{s}_p$$

is a normal to the triangular primitive 11, $$\vec{v}_{02} = (x_{p2} - x_{p0})\vec{x}_p + (y_{p2} - y_{p0})\vec{y}_p + (s_{p2} - s_{p0})\vec{s}_p$$

is the vector from vertex 0 to vertex 2 of the triangular primitive 11, $$\vec{v}_{01} = (x_{p1} - x_{p0})\vec{x}_p + (y_{p1} - y_{p0})\vec{y}_p + (s_{p1} - s_{p0})\vec{s}_p$$

is the vector from the triangle's vertex 0 to vertex 1, $$\vec{s}_p$$

is a unit normal along the s/w direction, $$a_{ps} = (x_{p2} - x_{p0})(y_{p1} - y_{p0}) + (x_{p1} - x_{p0})(y_{p2} - y_{p0}) \neq 0, \text{ because the}$$

because the points in the triangular primitive 11 are distinct, $$a_{px} = (y_{p2} - y_{p0})(s_{p1} - s_{p0}) - (y_{p1} - y_{p0})(s_{p2} - s_{p0}),$$

$$a_{py} = -(x_{p2} - x_{p0})(s_{p1} - s_{p0}) + (x_{p1} - x_{p0})(s_{p2} - s_{p0}),$$

$$\vec{S}_0 = x_{p0}\vec{x} + y_{p0}\vec{y} + s_{p0}\vec{s} \text{ and } \vec{S} = x_p\vec{x} + y_p\vec{y} + s_p\vec{s},$$

$$s_{p0} = \frac{s_0}{w_0},$$

$s_o$ is the user specified texture coordinate at vertex 0, and finally, $w_o$ is the spatial homogeneous coordinate at vertex 0.

The foregoing notation is utilized throughout the remaining discussion.

Now, solving for $s_p$ using Equation 1.0, $$s_p(x_p, y_p) = s_{p0} - (x_p - x_{p0})\frac{a_{px}}{a_{ps}} - (y_p - y_{p0})\frac{a_{py}}{a_{ps}} \quad \text{[Equation 1.1]}$$

Another plane equation for $t_p$ can be found using the same logic for $s_p$, as follows.

$$(\vec{T} - \vec{T}_0) \cdot \vec{b} = 0, \quad \text{[Equation 1.2]}$$

where $$\vec{T} = x_p\vec{x} + y_p\vec{y} + t_p\vec{t}, \vec{t}_o = x_{p0}\vec{x} + y_{p0}\vec{y} + t_{p0}\vec{t}, \vec{b}$$

is the normal to the plane.

The plane equation 1.2 is solved for the $t_p$ coordinate as follows:

$$t_p(x_p, y_p) = t_{p0} - (x_p - x_{p0})\frac{b_{px}}{b_{pt}} - (y_p - y_{p0})\frac{b_{yp}}{b_{tp}} \quad \text{[Equation 1.3]}$$

where $b_{tp} = (x_2-x_0)(y_2-y_0)+(x_1-x_0)(y_2-y_0) \neq 0$ (note when the rasterizer computes $a_s$ above, it will be the same as $a_t$, so it can save a computation by saving the value), $$\vec{b} = \vec{v}_{02} \times \vec{v}_{01} = b_x\vec{x} + b_y\vec{y} + b_t\vec{t},$$

$$\vec{v}_{01} = (x_{p1} - x_{p0})\vec{x}_p + (y_{p1} + y_{p0})\vec{y}_p + (t_{p1} - t_{p0})\vec{t}_p$$

$$\vec{v}_{02} = (x_{p2} - x_{p0})\vec{x}_p + (y_{p2} - y_{p0})\vec{y}_p + (t_{p2} - t_{p0})\vec{t}_p \text{ and } \vec{t}_p$$

is a unit normal along the t/w direction, $b_{pt} = (x_{p2}-x_{p0})(y_{p2}-y_{p0})+(x_{p1}-x_{p0})(y_{p2}-y_{p0}) \neq 0$ (since the points in the triangular primitive 11 are distinct), $b_{px} = (y_{p2}-y_{p0})(t_{p1}-t_{p0})-(y_{p1}-y_{p0})(t_{p2}-t_{p0})$, and $b_{py} = -(x_{p2}-x_{p0})(t_{p1}-t_{p0})+(x_{p1}-x_{p0})(t_{p2}-t_{p0})$.

Similar reasoning can be applied for $q_p$. The plane equation for $q_p$ would be as follows:

$$(\vec{Q} - \vec{Q}_0) \cdot \vec{c} = 0 \quad \text{[Equation 1.4]}$$

where $$\vec{Q} = x_p\vec{x} + y_p\vec{y} + q_p\vec{q}, \vec{Q}_0 = x_{p0}\vec{x} + y_{p0}\vec{y} + q_{p0}\vec{q}, \vec{c}$$

is the normal to the plane.

Now, solving Equation 1.4 for the $q_p$ coordinate yields the following:

$$q_p(x_p, y_p) = q_{p0} - (x_p - x_{p0})\frac{c_{px}}{c_{pt}} - (y_p - y_{p0})\frac{c_{py}}{c_{pt}} \quad \text{[Equation 1.5]}$$

where $c_{tp} = (x_2-x_0)(y_2-y_0)+(x_1-x_0)(y_2-y_0) \neq 0$ (note when the rasterizer computes $a_s$ above, it will be the same as $a_t$, so it can save a computation by saving the value), $$\vec{c} = \vec{v}_{02} \times \vec{v}_{01} = c_x\vec{x} + c_y\vec{y} + c_t\vec{q}$$

with $\vec{v}_{01} = (x_{p1} - x_{p0})\vec{x}_p + (y_{p1} - y_{p0})\vec{y}_p + (q_{p1} - q_{p0})\vec{q}_p$, $$\vec{v}_{02} = (x_{p2} - x_{p0})\vec{x}_p + (y_{p2} - y_{p0})\vec{y}_p + (q_{p2} - q_{p0})\vec{q}_p, \vec{q}_p$$

is a unit normal along the q/w direction, $c_{pt} = (x_{p2}-x_{p0})(y_{p2}-y_{p0})+(x_{p1}-x_{p0})(y_{p2}-y_{p0}) \neq 0$ (since the points in the triangular primitive 11 are distinct), $c_{px} = (y_{p2}-y_{p0})(q_{p1}-q_{p0})-(y_{p1}-y_{p0})(q_{p2}-q_{p0})$, and $c_{py} = -(x_{p2}-x_{p0})(q_{p1}-q_{p0})+(x_{p1}-x_{p0})(q_{p2}-q_{p0})$.

So, finally an expression for each of the texture indices [s/q,t/q] respectively is as follows:

$$\frac{s_p(x_p, y_p)}{q_p(x_p y_p)}$$

from Equations 1.1, and 1.5 and $$\frac{t_p(x_p, y_p)}{q_p(x_p y_p)}$$

from Equations 1.3 and 1.5.

b. Derivation of Gradient

Here are some preliminary derivatives for the gradient calculation:

$$\frac{\partial s_p}{\partial x_p}, \frac{\partial s_p}{\partial y_p}, \frac{\partial t_p}{\partial x_p}, \frac{\partial t_p}{\partial y_p}, \frac{\partial q_p}{\partial x_p}, \frac{\partial q_p}{\partial y_p}.$$

The formula for them is obtained by taking the derivatives of the Equations above, 1.1, 1.3, 1.5, involving $s_p$, $t_p$ and $q_p$. Then, the values for $s_p$, $t_p$ and $q_p$ are derived by either using the formulas above or alternately interpolating them along the edge of the triangular primitive 11 to a particular span 12 and then along the edge of the span 12. Then, the derivatives of the texture coordinates are computed in terms of these variables. And, finally, use the OpenGL specification for gradient=max(these derivatives w/r to the texture coordinates).

First note the x screen coordinate is $x_p$ and the y screen coordinate is $y_p$.

Using Equation 1.1, take the derivative of $s_p$ with respect to the x screen coordinate, and also with respect to the y screen coordinate:

$$\frac{\partial s_p}{\partial x_p} = -\frac{a_{px}}{a_{ps}}, \text{ and } \frac{\partial s_p}{\partial y_p} = -\frac{a_{py}}{a_{ps}} \qquad \text{[Equation 2.0]}$$

Using Equation 1.3, take the derivative of $t_p$ with respect to the x screen coordinate, and also with respect to the y screen coordinate, as follows:

$$\frac{\partial t_p}{\partial x_p} = -\frac{b_{px}}{b_{ps}}, \text{ and } \frac{\partial t_p}{\partial y_p} = -\frac{b_{py}}{b_{pt}} \qquad \text{[Equation 2.1]}$$

Using Equation 1.5, take the derivative of $q_p$, with respect to the x coordinate, and also with respect to the y screen coordinate, as follows:

$$\frac{\partial q_p}{\partial x_p} = -\frac{c_{px}}{c_{ps}}, \text{ and } \frac{\partial q_p}{\partial y_p} = -\frac{c_{py}}{c_{pq}} \qquad \text{[Equation 2.2]}$$

At this point, there is a formula for $s_p$ and $t_p$ in terms of the primitive's vertices for any point in the triangular primitive 11. These formulas can be used to verify the accuracy of the method of interpolation of the texture coordinates along the left edge and then to interpolate the texture coordinates along the span 12. So, this formula is good for code verification. Equation 1.0 and Equation 1.3 reflect the values for $s_p$ and $t_p$ at any point in the primitive 11. Further, using equations 2.0 and $_{2.1}$ we note $$\frac{\partial s_p}{\partial x_p}, \text{ and } \frac{\partial t_p}{\partial x_p}$$

are constant for the entire primitive 11. So, as an optimization feature, the derivatives for these variables need to be calculated just once per primitive 11.

For the gradient $\Delta$, the derivatives of the true texture indices are calculated. Using the OpenGL specification definition in Section 3.8.1, the gradient $$\Delta = \max(\Delta_{ux}, \Delta_{uy}, \Delta_{vx}, \Delta_{vy}) \qquad \text{[Equation 3.0]}$$

where u and x are scaled texture coordinates (width and height, respectively) that are scaled to the base MIP map level and where (using the chain rule from calculus):

$$\nabla_{ux} = |\partial u / \partial x_p| = \left|\frac{\partial}{\partial x_p}\left(\frac{s_p}{q_p}\right)\right| \text{textureWidth} = \left|\frac{\frac{\partial s_p}{\partial x_p} - \frac{s_p}{q_p}\frac{\partial q_p}{\partial x_p}}{q_p}\right| \text{textureWidth}$$

and similarly, $$\nabla_{vx} = \left|\frac{\partial v}{\partial x_p}\right| = \left|\frac{\partial}{\partial x_p}\left(\frac{t_p}{q_p}\right)\right| \text{textureHeight} = \left|\frac{\frac{\partial t_p}{\partial x_p} - \frac{t_p}{q_p}\frac{\partial q_p}{\partial x_p}}{q_p}\right| \text{textureHeight}$$

$$\nabla_{uy} = \left|\frac{\partial u}{\partial x_p}\right| = \left|\frac{\partial}{\partial x_p}\left(\frac{s_p}{q_p}\right)\right| \text{textureWidth} = \left|\frac{\frac{\partial s_p}{\partial y_p} - \frac{s_p}{q_p}\frac{\partial q_p}{\partial y_p}}{q_p}\right| \text{textureWidth}$$

$$\nabla_{vy} = \left|\frac{\partial v}{\partial y_p}\right| = \left|\frac{\partial}{\partial y_p}\left(\frac{t_p}{q_p}\right)\right| \text{textureHeight} = \left|\frac{\frac{\partial t_p}{\partial y} - \frac{t_p}{q_p}\frac{\partial q_p}{\partial y_p}}{q_p}\right| \text{textureHeight}$$

where textureWidth and textureHeight are the width and height of the base texture level. Even though, and $$\frac{\partial s_p}{\partial x_p}$$

(refer to Equation 2.0) was constant along the primitive, equation 3.0 shows that $$\frac{\partial}{\partial x_p}\left(\frac{s_p}{q_p}\right)$$

is not. Also note that if future shadow texturing extension or 3D texturing is performed, then the gradient will also include the derivative of $$\frac{r}{q_p}.$$

Note the following: (a) the maximum function (which is our current estimate for the gradient) is an example of a function that is non-differentiable, so it does not make sense to interpolate it to find the derivatives of the gradient; (b) the gradient is nonlinear and also the x derivatives of the derivatives (the second derivative w/r to x and the mixed derivative for y) for the texture indices for homogeneous texture effect are also not linear across the span for the primitive; (c) for a line, the derivatives can be found just using the end points of a line; the interpolation for the texture indices is the same as was for the triangular primitive 11, namely, along the edge of the line; (d) for a point, the gradient turns out to be 1, so set all of the derivative, $$\frac{\partial s_p}{\partial y_p}, \frac{\partial t_p}{\partial x_p}, \frac{\partial t_p}{\partial y_p}, \frac{\partial q_p}{\partial x_p}, \frac{\partial q_p}{\partial y_p}$$

to zero and set $$\frac{\partial s_p}{\partial x_p}$$

to one.

c. Operation

Figure 4:
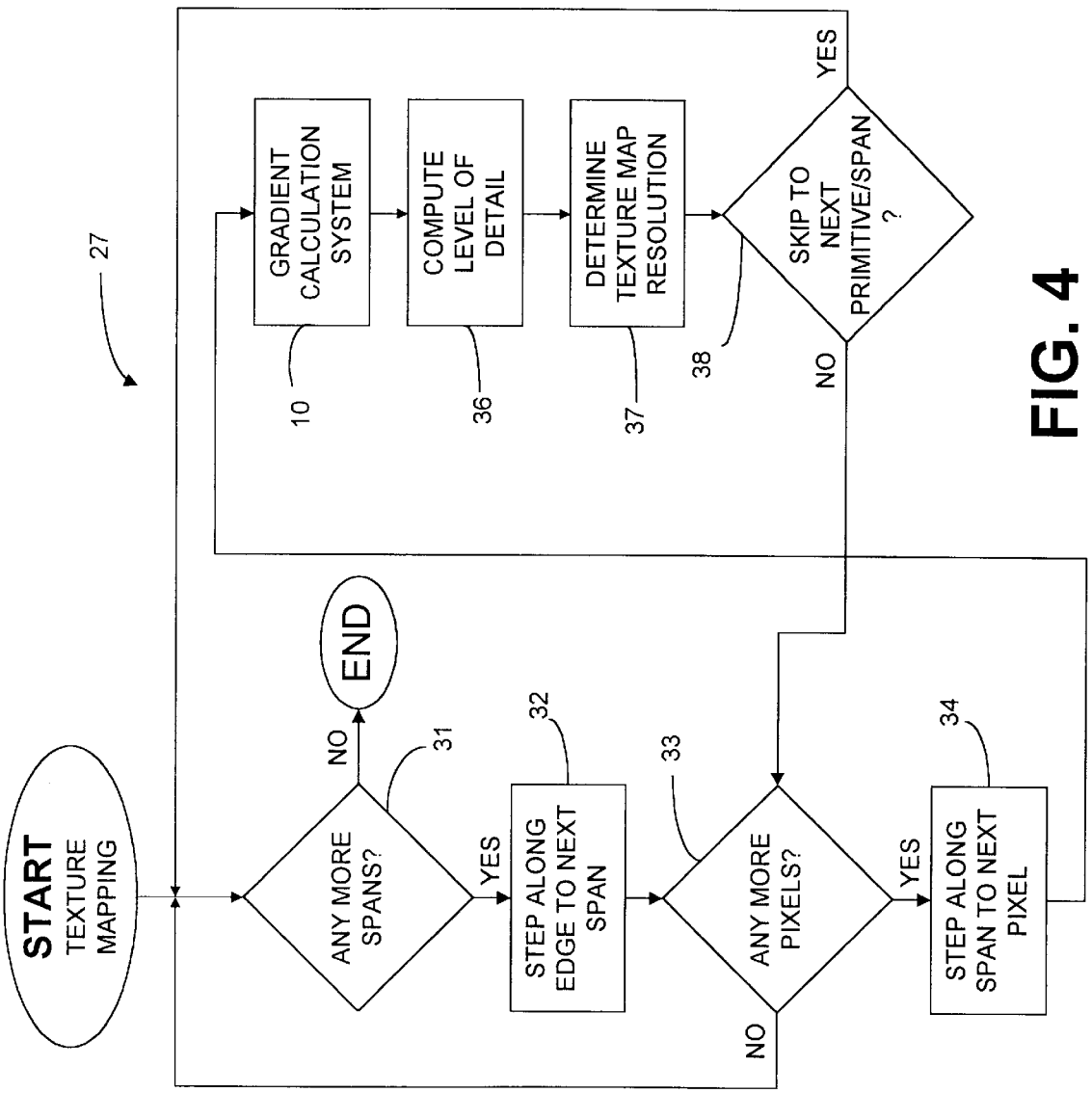
FIG. 4 is a flowchart showing the architecture, functionality, and operation of an example implementation of the texture mapping system (including the gradient calculation system, in particular) of FIG. 3.

The operation of the gradient calculation system 10 (the first embodiment of FIG. 3 as well as the second embodiment of FIG. 5) is described hereafter with reference to FIG. 4. In general, FIG. 4 shows a flow chart that sets forth not only the operation of the gradient calculation system 10, but also the architecture and functionality of the software-based system 10. The blocks of the flowchart can be viewed as sections of code.

In this discussion, in essence, each pixel 13 (FIG. 1) along each span 12 (FIG. 1) of a primitive 11 (FIG. 1) is analyzed, and then a MIP map 14 (FIG. 2) is selected for the pixel 13 at issue. As will be further discussed in detail hereinafter, the invention further provides an optimization feature that permits the gradient solution to be applied to, preferably, all pixels 13 of a primitive 11, or secondarily, to all subsequent pixels 13 of a span 12, when appropriate.

Prior to operation by the texture mapping system 27, rasterizer 25 (FIG. 3) computes $$\frac{\partial s_p}{\partial x_p}, \frac{\partial s_p}{\partial y_p}, \frac{\partial t_p}{\partial x_p}, \frac{\partial t_p}{\partial y_p}, \frac{\partial q_p}{\partial x_p}, \frac{\partial q_p}{\partial y_p}$$

for the primitive 11 using the equations above, which were set forth previously. Furthermore, the rasterizer 25 computes the $s_p/w$, $t_p/w$, $q_p/w$ for the first pixel 12 of each span 12 within the primitive 11. To accomplish this, the rasterizer 25 either uses the formulas using linear interpolation along the edge, just as with green, blue, red, or the depth dimension z or uses Equation 1.1, 1.3 and 1.5, as set forth above. The foregoing information will be used by the texture mapping system 27.

Next, with reference to FIG. 4, the texture mapping system 27 begins processing spans 12 of the primitive 11. A loop comprising blocks 31–33 ensures that all spans 12 of the primitive 11 are considered and processed At block 31, a determination is made as to whether any more spans 12 remain to be processed by the texture mapping system 27. When all the spans have been processed, the texture mapping system 27 concludes. If spans 12 remain to be processed, then block 31 transfers to block 32.

Block 32 steps along the edge of the primitive 11 to identify the next span 12 for analysis. Block 32 transfers to block 33.

At block 33, a loop is entered to ensure that all pixels along a span are considered and processed. Block 33 makes an inquiry as to whether any more pixels 13 remain to be processed If not, then block 33 transfers back to block 31, where another span 12 is retrieved If, at block 33, more pixels remain to be processed along the span 12, then block 33 transfers to block 34.

Block 34 steps along the span 12 to the next pixel 13. Block 34 transfers to gradient calculation system 10 of the invention.

As indicated in block 10, the gradient calculation system 10 now computes the gradients for the present pixel 13 using an exact closed form solution for the partial derivatives. It utilizes the primitive and span information from the rasterizer 25. Furthermore, in the equations that are set forth hereafter, the gradient calculation system 10 uses the MIP map 14 that was selected for the previous pixel as a reference. At this point, the system 10 computes:

(a) $s_p$, $t_p$, and $q_p$ using linear interpolation, as follows:

$$s_{pnext} = s_{plast} + \frac{\partial s_p}{\partial x};$$

$$t_{pnext} = t_{plast} + \partial t_p / \partial x_p; \text{ and}$$

$$q_{pnext} = q_{plast} + \partial q_p / \partial x_p.$$

(b) the texture indices $$\frac{s_p}{q_p}, \frac{t_p}{q_p};$$

and
(c) the gradient at the pixel 13 using the primitive information (i.e., $$\frac{\partial s_p}{\partial x_p}, \frac{\partial s_p}{\partial y_p}, \frac{\partial t_p}{\partial x_p}, \frac{\partial t_p}{\partial y_p}, \frac{\partial q_p}{\partial x_p}, \frac{\partial q_p}{\partial y_p}$$

for the primitive 11) from the rasterizer 25, the information from the foregoing step (a), and Equation 3.0.

Next, as indicated at block 36, the level $\lambda$ of detail is determined for the pixel 13 by the texture mapping system 27, as follows:

$$\lambda = \log_2[\rho(x,y)],$$

where $$\rho = \max\left\{\max\left[\left|\frac{\partial u}{\partial x}\right|, \left|\frac{\partial u}{\partial y}\right|\right], \max\left[\left|\frac{\partial v}{\partial x}\right|, \left|\frac{\partial v}{\partial y}\right|\right]\right\}.$$

Note that the coordinates u, v define a location within an unnormalized integer coordinate system that corresponds to the normalized s, t coordinate system. Afterward, block 36 transfers to block 37.

At block 37, the texture mapping system 19 determines which MIP map 14 is appropriate based upon the level $\lambda$. If $\lambda$ is a constant that is near zero within a predefined range, then the appropriate MIP map for this pixel 13 is the one that is currently being analyzed. If $\lambda$ is less than a constant, then the MIP map should be larger (less resolution) and a magnify filter is utilized to generate the appropriate MIP map 14. Further, if $\lambda$ is a constant and is outside the predefined range, then the MIP map should be reduced (greater resolution) and a minify filter is utilized for this purpose.

Hence, at this point, the appropriate MIP map 14 has been identified and selected for the pixel 13 at issue.

In accordance with an optional optimization feature of the invention, as indicated at block 38, the texture mapping system 27 is configured to apply the gradient solution to, preferably, all remaining pixels 13 of the primitive 11 if this is the first pixel of the primitive 11 and if certain criteria are met. If this short cut cannot be taken, then the texture mapping system 27 can be further configured to determine whether or not a short cut can be taken with respect to the remainder of the span 12 that is at issue. In this regard, the texture mapping system 27 is configured to apply the gradient solution to all subsequent pixels 13 of the span 12, when appropriate based upon another set of criteria.

More specifically, the texture mapping system 27 is configured to compute and analyze $\partial Q/\partial x$ and $\partial Q/\partial y$. Moreover, if both of the foregoing quantities $\partial Q/\partial x$ and $\partial Q/\partial y$ are equal to zero, then the texture mapping system 27 can be designed to assign the current MIP map 14 to all remaining pixels 13 of the primitive 11. Alternatively, the texture mapping system 27 may be designed to assign the current MIP map 14 to all subsequent pixels 13 of the current span 12 of the primitive 11 when $\partial Q/\partial x$ and $\partial Q/\partial y$ are both zero at the present pixel 13. The design choice between the former scheme and the latter scheme should be based upon a balancing between accuracy and performance. In other words, the former is faster than the latter, but is less accurate than the latter. The latter design has been adopted in the preferred embodiment in order to achieve higher performance with only a slight compromise in accuracy.

After block 38, process control reverts back to block 33 for retrieving another pixel 13, if any remain to be processed, situated either within the current span 12 or on the next span 12, and the foregoing processing steps are reiterated. When an optimization short cut has not been taken, then during analysis of the next pixel 13, the MIP map 14 that was identified for the previous pixel 13 is utilized and analyzed, at least initially, and it could be magnified or minified, depending upon the calculations for the next pixel 13.

d. Example

For further clarification, an example software implementation of the texture mapping system 27 including the gradient calculation system 10 in accordance with the first embodiment of the invention is included herewith in the Appendix to this Detailed Description section. This example represents the currently known best mode for practicing the present invention.

B. Second Embodiment

Figure 5:
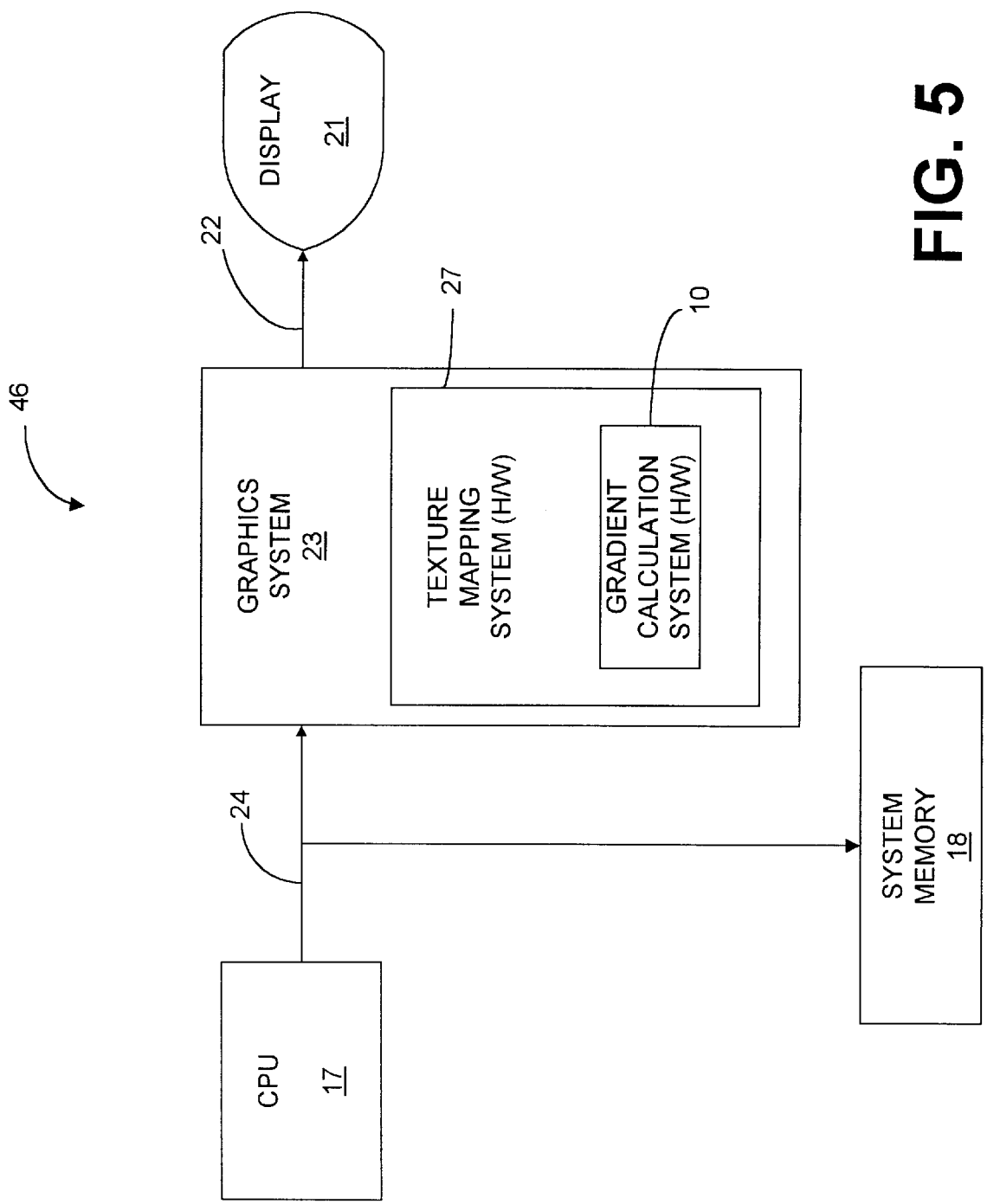
FIG. 5 is an electronic block diagram of a computer system having the gradient calculation system in accordance with a second embodiment of the invention implemented in a graphics system in connection with a texture mapping system in hardware (H/W)
Figure 6:
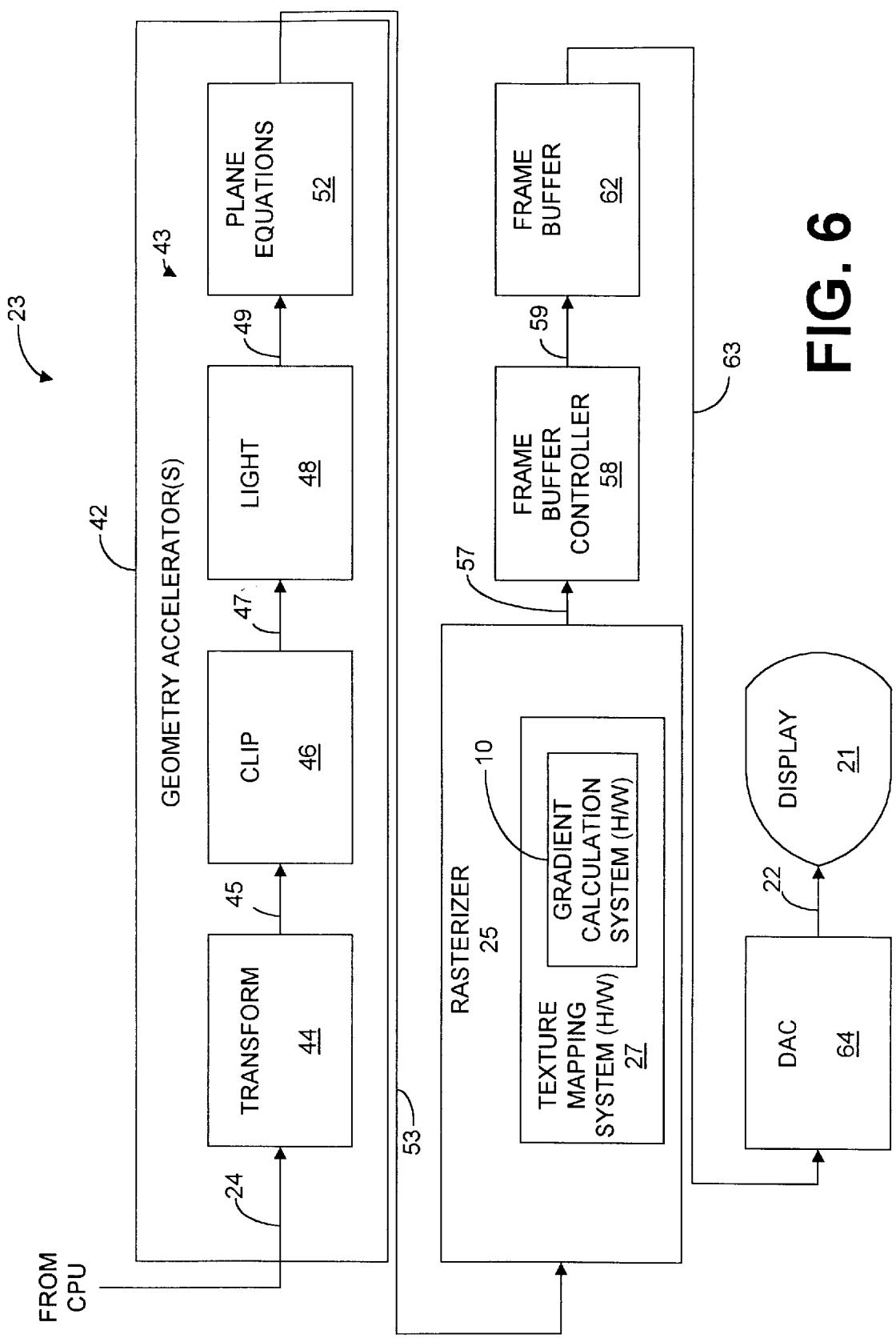
FIG. 6 is an electronic block diagram of the graphics system of FIG. 5.

A second embodiment of the invention is set forth in FIGS. 5 and 6 and generally denoted by reference number 46. As shown in FIG. 5, in this embodiment, the texture mapping system 27, as well as the gradient calculation system 10, are implemented in hardware (H/W) within the hardware-based graphics system 23. The texture mapping system 27 and gradient calculation system 10 generally exhibit the same architecture, functionality, and operation as their software counterparts that were described previously with respect to FIG. 4.

A lower level electronic block diagram that more specifically illustrates the architecture of the hardware-based graphics system 23 is shown in FIG. 6. Referring to FIG. 6, the computer graphics system 23 includes one or more geometry accelerators 42 that are configured to receive vertex data from the CPU 12 and to define the primitives 11 that make up the view to be displayed. Each geometry accelerator 42 comprises a number of the specialty control units 43 for processing the image data, including, for example, a transform mechanism (TRANS) 44 for performing transformations on the vertex data, such as scaling or moving a vertex in space, a clip mechanism (CLIP) 46 for clipping portions of objects that extend beyond a boundary, a light mechanism (LIGHT) 48 for enhancing the image data by simulating light conditions, and a plane equation mechanism (PLANE) 52 for defining the primitives in terms of mathematical floating point plane equations. Each of the control units 43 is typically implemented via cell logic and as separate distinct state machines. The output of the geometry accelerator 42, referred to as rendering data, is used to generate final screen coordinates and color data for each pixel and each primitive. The output 53 is passed to a rasterizer 25, which converts the geometry accelerator output 53 to fixed point format from floating point format and which produces pixel data 57.

The gradient calculation system 10 of the invention determines the gradients and assigns the MIP map(s) 14 to the pixels 13.

The pixel data 57 from the rasterizer 25 is next communicated to a frame buffer control 58 and then to a frame buffer 62. The frame buffer 62 serves to temporarily store the pixel data prior to communication to the display 21. The pixel data is passed from the frame buffer 62 through a digital-to-analog converter (DAC) 64 and then to the display 21.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims. Furthermore, in the Claims section hereinafter, any "means" element is intended to include or read upon any structure(s), material(s), or act(s) for performing any operational function(s) specified therewith.

Appendix

This Appendix to the Detailed Description section sets forth an example implementation of the texture mapping system 27 including the gradient calculation system 10 in accordance with the first embodiment of the invention.

```
1:
2:   /*   Routine:getScaledAbsDeriv
3:        *
4:        * Description: Calculate the scaled derivative for a particular texture
5:        *              coordinate by calculating the derivative then
6:        *              multiplying it be either the width or height
7:        *              of the texture map as appropriate.
8:        *
```

```
 9:    * Inputs:
10:    *        derivTexwrScreenCoor  - the derivative of the texture coordinate
11:    *                                either s or t with respect to the screen coordinate
12:    *        textureIndex          - either s/q or t/q
13:    *        derivQwrScreenCoor    - the derivative of the homogenous effect Q with respect
14:    *                                to the screen coordinate. Where the screen coordinate
15:    *                                is x/w, or y/w and x is the normalized device coordinate
16:    *        texSizeDivQ           - the texture size (either width or height devided by Q
17:    *
18:    * Return value: the derivative of either u or v with respect to a screen coordinate
19:    *               scaled to the texture size.
20:    *
21:    * Algorithm:
22:    * Texture mapping assume s/w is linear, q/w is linear.
23:    * Notation: Let S = s/w, Q = q/w.
24:    *
25:    * Taking the partial of the quotient s/q with respect to x,
26:    * d(s/q)/dx = d(S/Q)/dx = 1/Q * (ds/dx - S/Q dQ/dx)
27:    * where all the d's in the above indicate partial deltas
28:    * but we don't have greek ascii so they will have to do.
29:    * Same derivative form for the y derivatives.
30:    * And same formula for the t texture coordinate.
31:    * Finally, du/dx - d(s/q)/dx * (texture width)
32:    *
33:    * Performance tip of the day:
34:    * If dQ/dx = 0 = dQ/dy, then Q is constant.
35:    * and d(s/q)/dx = 1/Q * dx/dx.
36:    * And dS/dx is constant for the entire primitive
37:    * refer tothe rast_triangle.c or rast_line.c
38:    * for it's calculation.
39:    * Similarly for the t texture coordinate and for the
40:    * y derivative.
41:    * So we can do this calculation once per span rather
42:    * than for each pixel in the span.
43:    *
44:   */
45:
46:   #ifdel PRAGMA_INLINE
47:   #pragma inline getScaledAbsDeriv
48:   #endif
49:
50:   static Float getScaledAbsDeriv(Float derivTexwrScreenCoor,
51:                                  Float textureIndex,
52:                                  Float derivQwrScreenCoor,
53:                                  Float texSizeDivQ)
54:
55:   {
56:       Float floatDeriv;
57:
58:       /*
59:        * Compute the derivative of the texture coordinate in
60:        * terms of derivative of the spatially homogeneously corrected
61:        * s and q derivatives. The spatially homogeneously (neat adjective huh?)
62:        * corrected derivative is constant for a given primitive
63:        * but the non-corrected one may vary at a per-pixel basis.
64:        */
65:       floatDeriv = (derivTexwrScreenCoor - textureIndex * derivQwrScreenCoor) * texSizeDivQ;
66:
67:       if (floatDeriv < OGL_ZERO) floatDriv = -(FloatDeriv);
68:       return (floatDeriv);
69:   }
70:
71:
```

Now, therefore, the following is claimed:

1. A system for accurately establishing texture resolution in a texture mapping system associated with a computer graphics system, comprising:

a plurality of MIP maps with different texel resolutions;

gradient calculation logic configured to compute a mathematical closed form solution for texel gradients of one of said MIP maps relative to a pixel of a primitive, said mathematical closed form solution resulting in computation of exact gradients for said texel gradients; and MIP map selection logic configured to select an appropriate MIP map for said pixel from said plurality of MIP maps based upon said gradients.

2. The system of claim 1, wherein said gradient calculation logic is configured to compute first and second texel gradients $\partial(s/q)/\partial x$ and $\partial(t/q)/\partial y$ associated with each of said MIP maps at said pixel of a primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel.

3. The system of claim 1, further comprising logic configured to assign said appropriate MIP map to subsequent pixels of a span of said primitive when dQ/dx and dQ/dy are zero at said pixel.

4. The system of claim 1, further comprising logic configured to assign said appropriate MIP map to subsequent pixels of said primitive when $\partial Q/\partial x$ and $\partial Q/\partial y$ are zero at said pixel.

5. The system of claim 1, wherein said gradient calculation logic and said MIP map selection logic are implemented in hardware in a rasterizer of said computer graphics system.

6. The system of claim 1, wherein said gradient computation logic and said MIP map selection logic are implemented in software that is stored in memory and executed by a processor that is interfaced with said computer graphics system.

7. The system of claim 2, wherein said MIP map selection logic further comprises:
   logic configured to scale said gradients to each MIP map as follows:
   $\partial u/\partial x = \partial(S/Q)/\partial x *$(texture width); and
   $\partial v/\partial y = \partial(S/T)/\partial y *$(texture height);
   where u and v are scaled texture coordinates;
   logic configured to compute a level $\lambda$ for each MIP map as follows:

$$\lambda = \log_2[\rho(x,y)],$$

where $\rho = \max \{\max [|\partial u/\partial x|, |\partial u/\partial y|], \max [|\partial v/\partial x|, |\partial v/\partial y|]\}$; and
   logic configured to select said appropriate MIP map for said pixel from said plurality of MIP maps based upon said level $\lambda$.

8. A system for accurately establishing texture resolution in a texture mapping system associated with a computer graphics system, comprising:
   a plurality of MIP maps with different texel resolutions;
   gradient calculation means for computing first and second texel gradients $\partial(s/q)/\partial x$ and $\partial(t/q)/\partial y$ associated with each of said MIP maps at a pixel of a primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel; and
   MIP map selection means for selecting an appropriate MIP map for said pixel from said plurality of MIP maps based upon said gradients.

9. The system of claim 8, further comprising a means for assigning said appropriate MIP map to subsequent pixels of a span of said primitive when dQ/dx and dQ/dy are zero at said pixel.

10. The system of claim 8, further comprising a means for assigning said appropriate MIP map to subsequent pixels of said primitive when dQ/dx and dQ/dy are zero at said pixel.

11. The system of claim 8, wherein said gradient calculation means and said MIP map selection means are implemented in hardware in a rasterizer of said computer graphics system.

12. The system of claim 8, wherein said gradient computation means and said MIP map selection means are implemented in software that is stored in memory and executed by a processor that is interfaced with said computer graphics system.

13. The system of claim 8, wherein said MIP map selection means further comprises:
   first means for scaling said gradients to each MIP map as follows:
   $\partial u/\partial x = \partial(S/Q)/\partial x *$(texture width); and
   $\partial v/\partial y = \partial(S/Q)/\partial y *$(texture height);
   where u and v are scaled texture coordinates;
   second means for computing a level $\lambda$ for each MIP map as follows:

$$\lambda = \log_2[\rho(x,y)],$$

where $\rho = \max \{\max [|\partial u/\partial x|, |\partial u/\partial y|], \max [|\partial v/\partial x|, |\partial v/\partial y|]\}$; and
   third means for selecting said appropriate MIP map for said pixel from said plurality of MIP maps based upon said level $\lambda$.

14. A computer readable medium having a program for accurately establishing texture resolution in a texture mapping system associated with a computer graphics system, comprising:
   a plurality of MIP maps with different texel resolutions;
   logic for computing a mathematical closed form solution for texel gradients of one of said MIP maps relative to a pixel of a primitive, said mathematical closed form solution resulting in computation of exact gradients for said texel gradients; and
   logic for selecting an appropriate MIP map for said pixel from said plurality of MIP maps based upon said gradients.

15. A method for accurately establishing texture resolution in a texture mapping system associated with a computer graphics system, comprising the steps of:
   providing a plurality of MIP maps with different texel resolutions;
   computing a mathematical closed form solution for texel gradients of one of said MIP maps relative to a pixel of a primitive, said mathematical closed form solution resulting in computation of exact gradients for said texel gradients; and
   selecting an appropriate MIP map for said pixel from said plurality of MIP maps based upon said gradients.

16. The method of claim 15, further comprising the step of computing first and second texel gradients $\partial(s/q)/\partial x$ and $\partial(t/q)/\partial y$ associated with each of said MIP maps at said pixel of said primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel.

17. The method of claim 15, further comprising the step of assigning said appropriate MIP map to subsequent pixels of a span of said primitive when dQ/dx and dQ/dy are zero at said pixel.

18. The method of claim 15, further comprising the step of assigning said appropriate MIP map to subsequent pixels of said primitive when $\partial Q/\partial x$ and $\partial Q/\partial y$ are zero at said pixel.

19. The method of claim 15, further comprising the step of computing said gradients and selecting said appropriate MIP map using hardware in a rasterizer of said computer graphics system.

20. The method of claim 15, further comprising the step of computing said gradients and selecting said appropriate MIP map using software that is stored in memory and executed by a processor that is interfaced with said computer graphics system.

21. The method of claim 16, further comprising the steps of:
scaling said gradients to each MIP map as follows:
$\partial u/\partial x = \partial(S/Q)/\partial x *$(texture width); and
$\partial v/\partial y = \partial(S/Q)/\partial y *$(texture height);
where u and v are scaled texture coordinates,
computing a level $\lambda$ for each MIP map as follows:

$$\lambda = \log_2[\rho(x,y)],$$

where $\rho = \max \{\max [|\partial u/\partial x|, |\partial u/\partial y|], \max [|\partial v/\partial x|, |\partial v/\partial y|]\}$; and
selecting said appropriate MIP map for said pixel from said plurality of MIP maps based upon said level $\lambda$.

22. A system for accurately establishing texture resolution in a texture mapping system associated with a computer graphics system, comprising:
a plurality of MIP maps with different texel resolutions;
gradient calculation logic configured to compute a mathematical closed form solution for texel gradients of one of said MIP maps relative to a pixel; and
MIP map selection logic configured to select an appropriate MIP map for said pixel from said plurality of MIP maps based upon said gradients,
wherein said gradient calculation logic is configured to compute first and second texel gradients $\partial(s/q)/\partial x$ and $\partial(t/q)/\partial y$ associated with each of said MIP maps at said pixel of a primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel.

23. The system of claim 22, wherein said MIP map selection logic further comprises:
logic configured to scale said gradients to each MIP map as follows:
$\partial u/\partial x = \partial(S/Q)/\partial x *$(texture width); and
$\partial v/\partial y = \partial(S/T)/\partial y *$(texture height);
where u and v are scaled texture coordinates;
logic configured to compute a level $\lambda$ for each MIP map as follows:

$$\lambda = \log_2[\rho(x,y)],$$

where $\rho = \max \{\max [|\partial u/\partial x|, |\partial u/\partial y|], \max [|\partial v/\partial x|, |\partial v/\partial y|]\}$; and logic configured to select said appropriate MIP map for said pixel from said plurality of MIP maps based upon said level $\lambda$.

24. A system for accurately establishing texture resolution in a texture mapping system associated with a computer graphics system, comprising:
a plurality of MIP maps with different texel resolutions;
gradient calculation means for computing first and second texel gradients $\partial(s/q)/\partial x$ and $\partial(t/q)/\partial y$ associated with each of said MIP maps at a pixel of a primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel;
MIP map selection means for selecting an appropriate MIP map for said pixel from said plurality of MIP maps based upon said gradients; and
means for assigning said appropriate MIP map to subsequent pixels of a span of said primitive when dQ/dx and dQ/dy are zero at said pixel.

25. A system for accurately establishing texture resolution in a texture mapping system associated with a computer graphics system, comprising:
a plurality of MIP maps with different texel resolutions;
gradient calculation means for computing first and second texel gradients $\partial(s/q)/\partial x$ and $\partial(t/q)/\partial y$ associated with each of said MIP maps at a pixel of a primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel;
MIP map selection means for selecting an appropriate MIP map for said pixel from said plurality of MIP maps based upon said gradients; and
means for assigning said appropriate MIP map to subsequent pixels of said primitive when dQ/dx and dQ/dy are zero at said pixel.

26. A system for accurately establishing texture resolution in a texture mapping system associated with a computer graphics system, comprising:
a plurality of MIP maps with different texel resolutions;
gradient calculation means for computing first and second texel gradients $\partial(s/q)/\partial x$ and $\partial(t/q)/\partial y$ associated with each of said MIP maps at a pixel of said primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel;

MIP map selection means for selecting an appropriate MIP map for said pixel from said plurality of MIP maps based upon said gradients; and wherein said gradient calculation means and said MIP map selection means are implemented in hardware in a rasterizer of said computer graphics system.

27. A system for accurately establishing texture resolution in a texture mapping system associated with a computer graphics system, comprising:

a plurality of MIP maps with different texel resolutions;

gradient calculation means for computing first and second texel gradients $\partial(s/q)/\partial x$ and $\partial(t/q)/\partial y$ associated with each of said MIP maps at a pixel of said primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel;

MIP map selection means for selecting an appropriate MIP map for said pixel from said plurality of MIP maps based upon said gradients; and wherein said gradient computation means and said MIP map selection means are implemented in software that is stored in memory and executed by a processor that is interfaced with said computer graphics system.

28. A system for accurately establishing texture resolution in a texture mapping system associated with a computer graphics system, comprising:

a plurality of MIP maps with different texel resolutions;

gradient calculation means for computing first and second texel gradients $\partial(s/q)/\partial x$ and $\partial(t/q)/\partial y$ associated with each of said MIP maps at a pixel of a primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel;

MIP map selection means for selecting an appropriate MIP map for said pixel from said plurality of MIP maps based upon said gradients; and wherein said MIP map selection means comprises a first means for scaling said gradients to each MIP map as follows:

$\partial u/\partial x = \partial(S/Q)/\partial x$*(texture width); and $\partial v/\partial y = \partial(S/Q)/\partial y$*(texture height);

where u and v are scaled texture coordinates, and a second means for computing a level $\lambda$ for each MIP map as follows:

$$\lambda = \log_2\{\rho(x,y)\},$$

where $\rho = \max\{\max[|\partial u/\partial x|, |\partial u/\partial y|], \max[|\partial v/\partial x|, |\partial v/\partial y|]\}$; and a third means for selecting said appropriate MIP map for said pixel from said plurality of MIP maps based upon said level $\lambda$.

29. A method for accurately establishing texture resolution in a texture mapping system associated with a computer graphics system, comprising the steps of:

providing a plurality of MIP maps with different texel resolutions;

computing a mathematical closed form solution for texel gradients of one of said MIP maps relative to a pixel;

selecting an appropriate MIP map for said pixel from said plurality of MIP maps based upon said gradients; and computing first and second texel gradients $\partial(s/q)/\partial x$ and $\partial(t/q)/\partial y$ associated with each of said MIP maps at said pixel of a primitive based upon the following expressions:

$$\partial(s/q)/\partial x = \partial(S/Q)/\partial x = 1/Q[\partial S/\partial x - (S/Q)(\partial Q/\partial x)]$$

and $$\partial(t/q)/\partial y = \partial(T/Q)/\partial y = 1/Q[\partial T/\partial y - (T/Q)(\partial Q/\partial y)],$$

where S is s/w, T is t/w, Q is q/w, w is a spatial perspective parameter and corresponds to each MIP map, s and t are texel coordinates, x and y are screen coordinates, and q is a homogeneous texture effect parameter associated with each texel.

30. The method of claim 29, further comprising the steps of:

scaling said gradients to each MIP map as follows:

$\partial u/\partial x = \partial(S/Q)/\partial x$*(texture width); and $\partial v/\partial y = \partial(S/Q)/\partial y$*(texture height);

where u and v are scaled texture coordinates, computing a level $\lambda$ for each MIP map as follows:

$$\lambda = \log_2\{\rho(x,y)\},$$

where $\rho = \max\{\max[|\partial u/\partial x|, |\partial u/\partial y|], \max[|\partial v/\partial x|, |\partial v/\partial y|]\}$; and selecting said appropriate MIP map for said pixel from said plurality of MIP maps based upon said level $\lambda$.

* * * * *